United States Patent [19]

Stitzlein et al.

[11] Patent Number: 4,628,511
[45] Date of Patent: Dec. 9, 1986

[54] APPARATUS FOR ANALYSIS OF COMPUTER CHANNEL FAILURES

[75] Inventors: Teddy K. Stitzlein; William P. Simonds, both of Houston, Tex.

[73] Assignee: Shell Oil Company, Houston, Tex.

[21] Appl. No.: 764,502

[22] Filed: Aug. 8, 1985

Related U.S. Application Data

[63] Continuation of Ser. No. 648,338, Sep. 6, 1984, abandoned, which is a continuation of Ser. No. 352,274, Feb. 25, 1982, abandoned.

[51] Int. Cl.$^4$ .............................................. G06F 11/22
[52] U.S. Cl. ..................................... 371/22; 364/900; 371/20
[58] Field of Search ................... 371/20, 22, 24, 25, 371/60, 57, 61, 67, 68

[56] References Cited

U.S. PATENT DOCUMENTS

| Re 31,407 | 10/1983 | Furtman et al. | 364/200 |
| 3,818,458 | 6/1974 | Deese | 364/200 |
| 3,906,454 | 9/1975 | Martin | 364/200 |
| 4,040,025 | 8/1977 | Morrill, Jr. et al. | 364/900 |
| 4,166,290 | 8/1979 | Furtman et al. | 364/200 |
| 4,303,987 | 12/1981 | Haag et al. | 364/900 |
| 4,351,059 | 9/1982 | Gregoire et al. | 371/22 |
| 4,363,123 | 12/1982 | Grover | 371/22 |
| 4,367,525 | 1/1983 | Brown et al. | 364/200 |
| 4,425,643 | 1/1984 | Chapman et al. | 371/22 |
| 4,434,488 | 2/1984 | Palmquist et al. | 364/900 X |
| 4,489,414 | 12/1984 | Titherley | 371/20 |
| 4,498,716 | 2/1985 | Ward | 371/22 |

Primary Examiner—Gareth D. Shaw
Assistant Examiner—Daniel K. Dorsey

[57] ABSTRACT

A method and apparatus for identifying the failing equipment in a computer system when a failure condition is experienced by a computer operator while accessing a computer input/output channel. The apparatus has a memory system which records pre- and post-failure events, which recordings are used for analyzing signal activity on the input/output channel. The signals retained in memory may be output to a hard copy device in an easily understood format to provide a picture or input/output bus activity for the time surrounding the failure event. The operator may utilize the hard copy output to rapidly diagnose the cause of computer failure.

6 Claims, 3 Drawing Figures

4,628,511

APPARATUS FOR ANALYSIS OF COMPUTER CHANNEL FAILURES

This is a continuation of application Ser. No. 648,338, filed Sept. 6, 1984, now abandoned, which is a continuation of application Ser. No. 352,274, filed Feb. 25, 1982, now abandoned.

BACKGROUND OF THE INVENTION

The present invention relates to computers and more particularly to an apparatus for monitoring the activity between a peripheral unit and a computer. The apparatus is connected to the in-out interface between the computer and the peripheral unit and analyzes the activity on the bus to determine the cause of computer failures.

Most computers operate by receiving instructions or data from an outside source which is transmitted to the computer which then performs certain functions on the data and supplies an answer to the outside source. When a computer fails to function properly, it is difficult to determine the cause of failure. It could occur as a result of failure to receive information from the outside source or failure of the computer to transmit its results to the outside source. In either case the actual detection of the cause of the malfunction is difficult.

In conventional computer systems the data going into the computer and the data coming out is not displayed but merely manipulated either in the computer or the outside source with only the final result being displayed in a printed format. Similarly, the data that is transmitted to the computer is not displayed but merely transmitted from a recorded source such as a tape or cards or similar materials to the computer. In the past, it has been necessary to repeat the portion of the operation around the computer failure and then attempt to diagnose or guess at the cause of the failure of the computer to operate properly.

SUMMARY OF THE INVENTION

In accordance with the invention there is provided a method and apparatus for identifying the failing equipment in a computer system. The computer channel analyzer (CCA) is a test unit within a computer environment which attaches to a computer input/output interface bus and analyzes signal activity on that bus. The CCA has a memory system which records events occurring on the bus for post-failure analysis. The CCA memory system may store data which appears immediately prior to a detected failure event as well as immediately following the event. The signals retained in memory may be output to a hard copy device in an easily understood format to provide a picture of the input/output interface bus activity for the time surrounding the failure event. The CCA utilizes a buffer assembly at the point of attachment to the computer input/output interface bus to isolate the computer signals from the CCA.

BRIEF DESCRIPTION OF THE DRAWINGS

The present invention will be more easily understood from the following description of a preferred embodiment when taken in conjunction with the attached drawing in which.

DETAILED DESCRIPTION OF THE INVENTION

The CCA system continually monitors the in/out bus of the computer and has available all data being transmitted to or from the computer. When the operator desires to locate a fault in the computer system, he selects events which occur on the in/out lines and the CCA system monitors the bus activity for these events. The operator programs the system to search for these events and the system will continually store the data whenever one of the selected events occur. The data storage capacity of the system is roughly 4K words wherein each word can have up to 96 bits of information with 16 bits being reserved for time stamp. The system is designed so that the first-in data is the first-out and thus the oldest data in the storage is cancelled by writing the latest data over the top of it. In addition to the selecting of events for initiating the storing of data, the data in the memory can be frozen whenever a particular event selected by the operator occurs. A freeze can only occur upon a store cycle so that the data triggering the freeze will be available to the operator. Some of the events which could trigger a freeze would be a command from the system computer based on the data content as read from the sample memory, or an excessive count of certain recognizable events, or sample memory address reading. Also, the memory may be frozen when the system interface senses a loss of monitored bus activity for a time in excess of the specified maximum. Further, a memory freeze may occur when a sequence of four bytes or a portion of the sequence is observed during a bus communication to any device. Once the memory freeze occurs, the system can print out the data from the sample memory storage upon command and indicate an alarm to the operator on a CRT screen.

From the above brief description, it is seen that the operator can select what events he desires to trigger the storage of data in the system memory. The operator also selects events or a sequence of events or other criteria for freezing the data in the storage. The operator can command a print-out of the data, inspect it and from this either diagnose the problem of the computer system that is being monitored or select additional events for storing data or criteria for freezing data. Thus, by continuous operation of the system the operator can pinpoint the area of difficulty with the monitored computer system and take corrective action.

Figure 1:
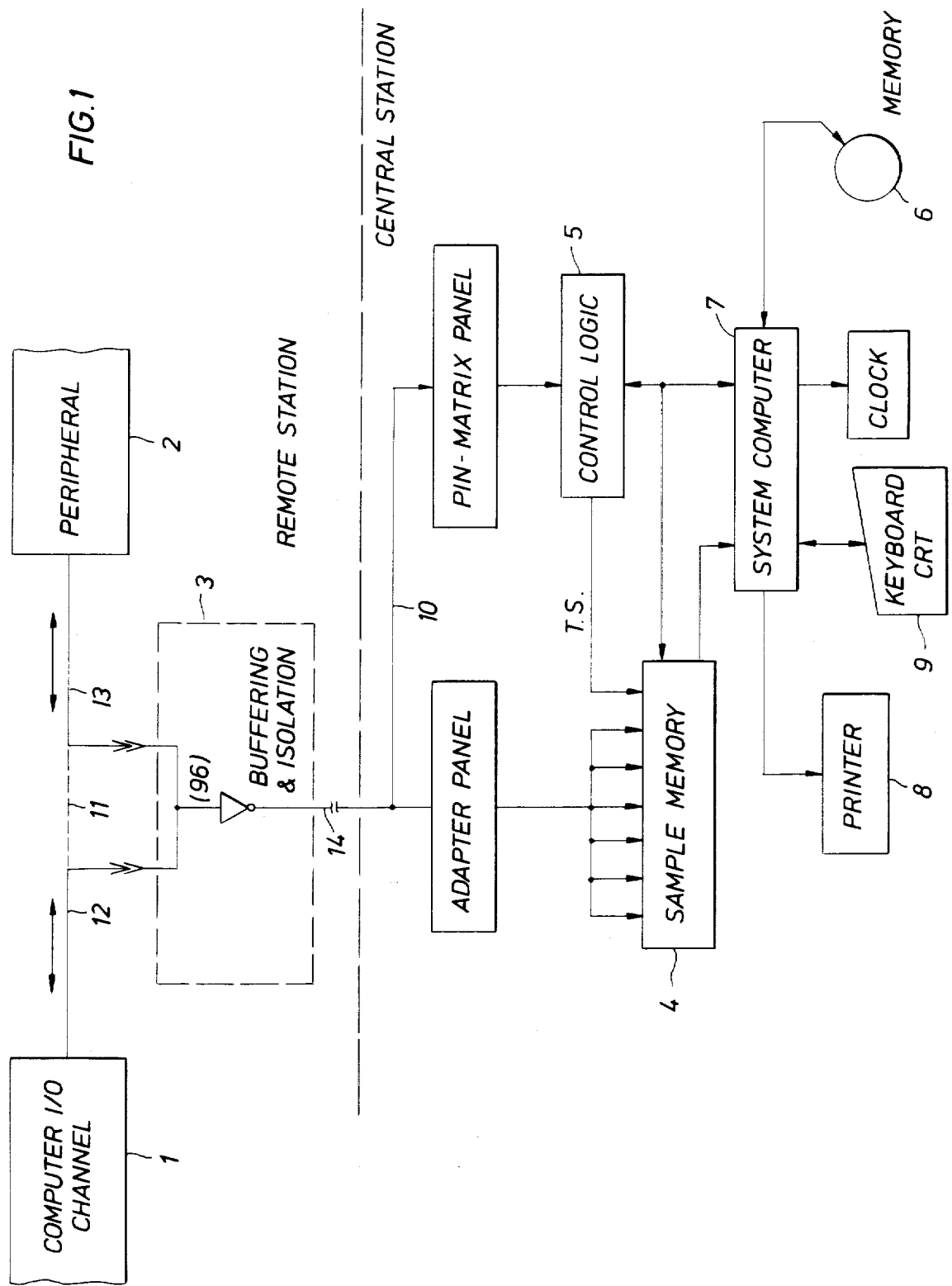
FIG. 1 is a block diagram of the complete system.

The CCA is an input/output (I/O) channel bus signal listening device which must have all I/O signals made available to it. The CCA attachment to these channels does not disturb the normal bus activity and does not affect the channel as the CCA is powered up or down. Referring now to FIG. 1, the elements which comprise the CCA will be described. The computer channel analyzer is comprised of isolation and buffering circuit 3, sample memory 4, control logic 5, memory 6, Analyzer/computer 7, CRT/keyboard 9, and an optional printer 8. The CCA attachment is made at the point where a computer interface cable attaches to the I/O channel, via cable 12. The cable is "looped through" isolation circuit 3 and returns via cable 13 to the original termination point, peripheral unit 2. The isolation and buffering circuit 3 provides a high impedance signal pick-off at the point of loop-through. Cable 14 connects this picked-off signal to sample memory 4. Circuit 3 effectively isolates the I/O bus signals from the CCA and provides the signals to the CCA. In effect, the result is as if a cable 11 was tied to cables 12 and 13 in series and cables 12 and 13 had no termination. The buffer circuit used in isolation and buffering circuit 3 provides resistive isolation and a high input impedance. For instance, total input impedance for each signal may be greater than 20 K ohms in parallel with 50 picofarads. The individual buffer circuits are comparators which output $T^2L$ signals to the CCA. The comparator used may be one commonly available such as the National Semiconductor LM-161 circuit or Texas Instruments 751070 circuit.

Sample memory 4 is a static random access memory (RAM) semiconductor memory system. Although the size is arbitrary, for the description of the preferred embodiment which follows, the size of the memory will be 4,096 words, each word being 104 bits wide. The significance of the word width will become apparent in the following discussion. The memory may be accessed from both isolation and buffering circuit 3 and analyzer/computer 7 via control logic 5. The samples which are input to the sample memory in the example to follow are 104 bit words, but the computer 7 may only read discrete bytes (or groups of 8 bits) of the samples. The sample memory is used as a first in/first out (FIFO) memory which upon command accepts data from I/O bus and stores it for later access by the Analyzer computer. The detailed function of the sample memory will be described more fully in the following discussion.

As explained above, the control logic circuit 5 controls the storing of data in the memory as well as freezing the information stored in the memory. The control logic circuit is a hardwired circuit which can be programmed in a particular mode by means of the system computer 7. The necessity of a hardwired system is readily appreciated since it would be impossible for the computer 7 to monitor the data on the lines 12 and 13 and react in time to store the data or freeze the data in the memory when certain events occurred. The operator selects via a Pin Matrix Panel what 16 bits of the word that the wants to monitor for event recognition. The particular 16 bits are selected by means of patch pins in the Pin Matrix Panel that must be installed by the operator. The computer is preprogrammed so that the operator can select various events which he desires to store and also various events which he desires to utilize to freeze the information stored in the system memory. After the operator has selected the 16 bits of the I/O signals to be monitored, he can select which bit of the 16 is to trigger a store cycle and if the bit is to be positive edge sensed or negative edge sensed. Thus, the operator has a choice of one of 32 events to trigger a store cycle. The circuits in control logic circuit then monitor the traffic on the I/O bus for the selected event for triggering a store cycle. The operator can also select the events, times or sequence of events that will trigger a freeze cycle. Representative examples of two of the circuits in the control logic circuit are shown in FIGS. 2 and 3 which illustrate a freeze circuit and storing circuit respectively.

Figure 2:
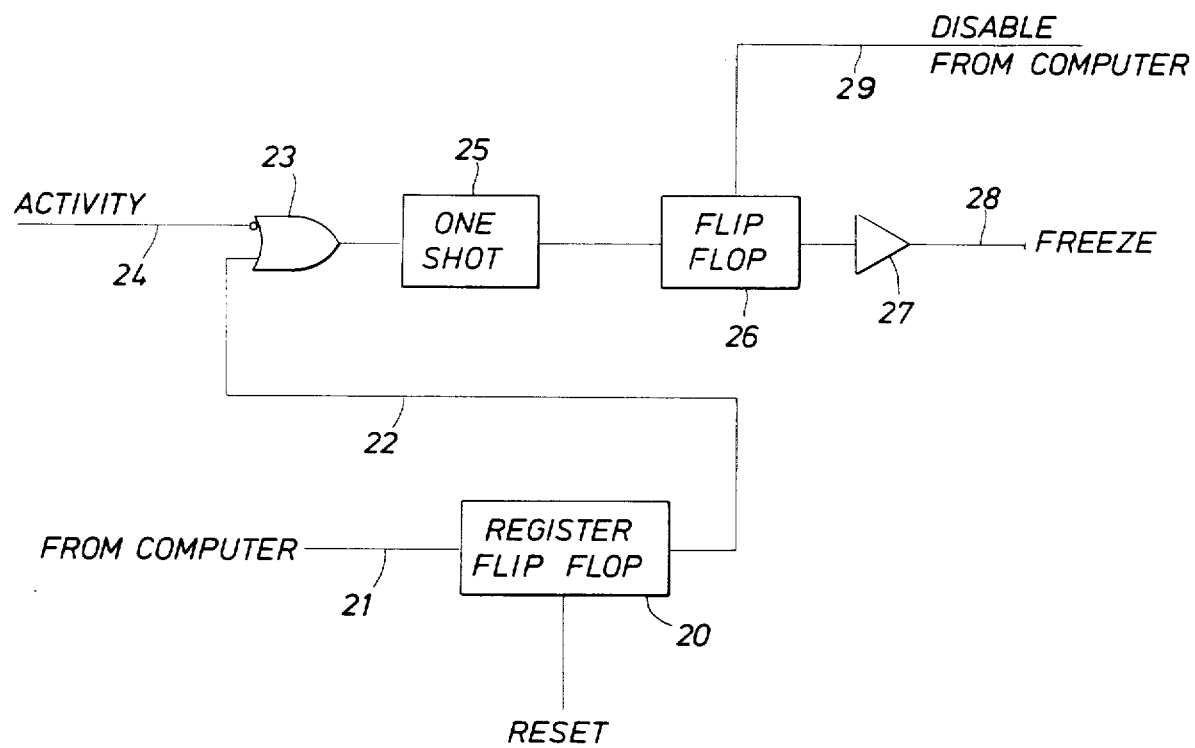
FIG. 2 is a detailed drawing of one function of the control logic circuit of FIG. 1.

In FIG. 2 a flip-flop register 20 containing a plurality of flip-flops that are set by a signal 21 from the computer to produce an output signal on the line 22. The signal on line 22 furnishes one signal to an OR circuit 23 whose other signal is supplied by the sensed activity on the lines 12-13 of FIG. 1. Thus, in the absence of any signal on the lines 22 and 24, the OR circuit 23 will activate the one-shot multivibrator 25 to supply a signal to the flip-flop 26. The flip-flop 26 will then supply a signal to the amplifier 27 whose output on the line 28 is used to actuate the freeze circuit in the system memory. The circuit is also supplied with a disable signal 29 from the computer which can be used to disable the flip-flop 26 to prevent a freeze of the data in the system memory. The signal on line 24 is selected by the patch pins that have previously been installed by the operator. Thus, the signal on line 22 is one of the 16 bits that can trigger the store and freeze cycles.

Figure 3:
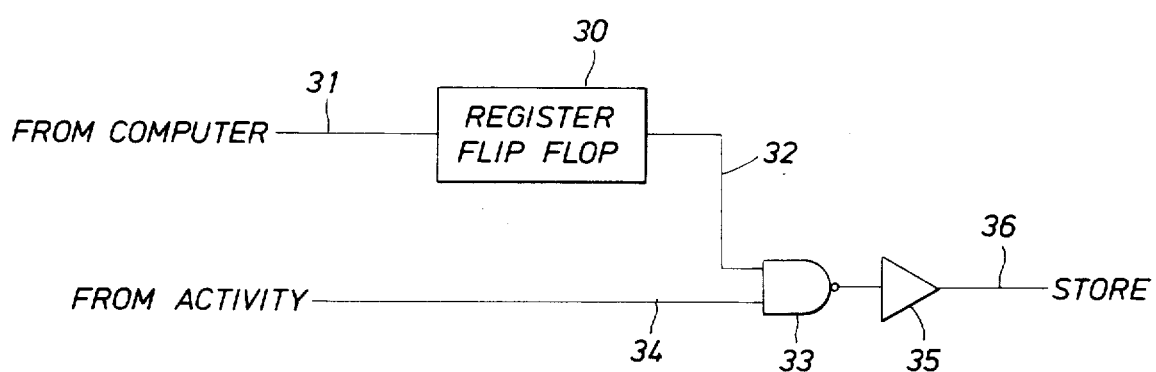
FIG. 3 is a detailed drawing of a second function of the control logic circuit of FIG. 1.

Referring to FIG. 3, there is shown a circuit which can be used to store data in the system memory. The circuit utilizes a register flip-flop 30 which is set by a signal 31 from the computer. The signal is supplied as one signal to NAND circuit 33 whose other signal 34 is supplied from the monitored activity. The circuit can be designed to operate so that whenever activity is sensed on line 34 which is connected to a particular data bit in the sensed data by the patch pins which represents transmittal of data from the peripheral unit 2 to the computer 1. For example, whenever this data bit goes positive, the NAND circuit would trigger and the data being transmitted would be stored in the memory circuit. It is obvious that the system memory is not sufficiently large to store all of the data being transmitted between the two units and the data to be stored must be selected based on the desires of the operator. As an example, if the operator suspects that the difficulty lies in the transmission of data from the peripheral unit to the computer, he can elect to store only this data in the memory and then for example, freeze the memory on an excessive count of this event. When the frozen data is then printed out on the printer he can examine it to determine which peripheral caused the activity.

Control logic 5 acts as a control point for data being transferred to analyzer computer 7 from sample memory 4. It also contains the hard wired diagnostic logic of the CCA system and must have access to all of the I/O signals of computer 1 via transfer links 10.

Analyzer computer 7 which controls the CCA may be any of a number of commercially available computers, one of which is the Intel 80/20 system with a 32K byte memory system. Interfaced to computer 7 may be a floppy disc memory 6, a printer 8 for hard copy, and a CRT/keyboard 9. Of course, sample memory 4 is also interfaced to computer 7 via control logic 5. The speed of computer 7 is not critical in the invention since all high speed operations are performed with hardwired logic as explained above. Computer 7 serves as a controller and operator interface for the CCA. It has an additional memory separate from sample memory 5 and of sufficient capacity to work with a computer language which may be provided to accommodate operator interface. The operation of the system of the invention will now be described wherein particular computers and memory types and circuitry will be referred to. However, it is understood that the description is for purposes of illustration and in no way limits the versatility of the system of the invention.

As described above, signal pick-off is accomplished at isolation and buffering circuit 3. The interface size (number of bits accessed) may vary depending on the computer 1 being monitored, but the principle of operation will remain the same. For instance, if computer 1 is a Univac 1100 system there are either 84 signals to be acquired by word interface or 38 signals in a single byte interface. If the single byte interface is utilized, one cable having at least 38 conductors is sufficient. The word interface, however, uses two cables, an "in" and an "out" cable each of which carries 42 signals. In operation, the selected 16 data lines of the 88 data lines are monitored for certain prescribed events which cause a store operation to occur in sample memory 4. Each store operation is an I/O store of 88 signal lines plus a time stamp number for identifying the instant of store operation. In the embodiment described, that time stamp may be 16 bits wide, which gives a total word width of 104 bits. A read operation by computer 7 may occur during the monitoring function and neither the normal store or the read operation will interfere with each other. The store operation is always given priority over the read operation, if the two happen to be requested simultaneously. Thus, in the normal course of I/O bus monitoring, samples are sequentially stored and bytes of the sample may be examined by the computer 7. When a prescribed event, which may be called a "freeze" is encountered by the CCA control logic 5, the storing operation is terminated, the CRT 9 may display an alarm message, and printer 8 may make a playout of current memory. An optional feature will allow the CCA to continue to sample the monitored I/O bus for a fixed number of samples before halting. In this way, stored data surounding the prescribed events may be retained.

The current value time stamp, which in the embodiment described is equal to a 16 bit number is stored with each sample in the sample memory. Thus, if information from 88 data lines is stored in conjunction with a 16-bit time stamp, 104 bits must be stored by sample memory 4. As described above, the memory 4 must therefore be at least 104 bits wide. The time stamp count is reinitiated with each store operation. In other words, the counter is automatically read, stored and reset each time a defined event causes a store or freeze operation. In order to reconstruct a time sequence from the sequence of stored values and sample memory, one must total the time stamp number of all intervening samples in order to establish a time difference between any two samples.

All memory store or "freeze" operations are caused by one or more of a selected set of positive and/or negative signal transitions on a specified set of I/O signal lines on the input/output bus to be monitored. The operator may specify, through CRT dialogue, which transitions of the selected sets he wishes to cause a store cycle. By means of patch pins he may select transitions on any one or more of the I/O signals, such as any one or more of 8 tag lines or 8 selection control lines of the computer being monitored. It is preferable to employ a fixed delay between each detected transition and the following sample memory store operation to ensure that the signal lines being monitored for transition reach a stable value following the transition. A delay of 50 nanoseconds has been found satisfactory in this regard.

In the preferred embodiment, signals which appear on either the 8 tag lines or 8 selection control lines, may be searched on the monitored I/O bus to identify certain events. The tag lines which are monitored may identify such things as address-in, address-out, command-in, or command-out signals. Likewise, the selection control lines may be used to cause a sample store operation to occur. The events identified on the monitored bus would generally cause either an event count or an elapsed time beginning or end. In the Univac system, for instance, any of the 16 patch panel selected bits of a word may be specified at system initialization time to perform one of these functions.

Events which cause a memory store operation may also be counted, as opposed to monitoring the time between occurrences. The event counter may be a binary counter, and in this instance a 16-bit binary counter, which is continuously compared to a preset 16-bit number in the CCA hard-wire interface. Equality of this comparison may be used to set a status bit for the CCA computer or the event counter may simply increment to be read by the CCA as required. The event count function allows one to locate a store irrespective of elapsed time, while the elapsed time counter described earlier allows one to locate a store as a function of elapsed time. Of course, the operator must specify the event byte (a specified number of I/O lines) to be counted.

Sample memory 4, then, is updated, the lapsed time counter is started or stopped, and the event counter is incremented whenever a selected signal transition occurs, on a selected set of I/O lines. When a memory store occurs, the CCA outputs the memory contents to a printer, stores the memory contents, and alarms. In the embodiment described a store may be caused by at least three factors. (1) CCA command may cause a store. This command may be based on bus data content as received from sample memory 4, from a particular elapsed time reading (if a specified maximum elapsed time is exceeded) or from an event count reading (if a specified event count number is reached or exceeded). (2) The CCA may sense a loss of monitored bus activity for a time in excess of some specified maximum. This activity monitoring operation takes place in the hard-wired interface electronics, all transitions on the I/O lines are sensed to define bus activity. (3) A memory store also occurs if a particular sequence of bytes (for instance four) is observed during I/O bus communication. This sequence search may be reinitiated for each occurrence of a chosen signal. Occurrences of a particular sequence may also be used to start/stop the elapsed time counter, or set a status bit.

What is claimed is:

1. Apparatus for monitoring signals on an input/output channel of a computer to passively detect communications failures between said computer and peripherals of said computer, comprising:
   means for accessing and detecting signals on said input/output channel of said computer, without interfering with said signals;
   first means interconnected with said means for accessing and detecting for preselecting at least one of said signals;
   control means interconnected with said first means for (i) detecting the signal level of said at least one preselected signal, (ii) generating time information about a particular point in relative time at which said at least one preselected signal is detected, and (iii) generating a predetermined command based upon said detection of said at least one preselected signal and predetermined internal logic;
   second means interconnected with said means for accessing and detecting and with said control means for storing signal, count, or time information, or combinations thereof, concerning said detection of said at least one preselected signal based upon said predetermined command; and analysis means interconnected with said second means for analysis of said stored information to determine from said stored information the cause of said communications failures on said channel and interconnected with said control means for predetermining said internal logic of said control means.

2. Apparatus according to claim 1, wherein said analysis means includes an operator-controlled analysis computer having a separate memory.

3. Apparatus according to claim 2, wherein said signal level of said control means may be preselected in functional relationship with said analysis computer.

4. Apparatus according to claim 3, wherein said control means further includes means for detecting at least one second signal wherein detection of said second signal freezes said second means after a preselected number of storing cycles responsive to said at least one second signal.

5. Apparatus according to claim 4, wherein said preselected number of storing cycles is preselected by said analysis computer.

6. Apparatus according to claim 1, wherein said information concerning said detection includes all of said signals from said means for accessing and detecting.

* * * * *